INVENTOR.
VERNON L. REDDING,
BY John B Davidson
ATTORNEY.

United States Patent Office 3,353,624
Patented Nov. 21, 1967

3,353,624
MINIMIZING MULTIPLE REFLECTIONS BY THE APPLICATION OF A PARTICULAR SEISMIC WAVE TO THE EARTH
Vernon L. Redding, Bellaire, Tex., assignor to Esso Production Research Company, a corporation of Delaware
Filed Feb. 21, 1966, Ser. No. 528,930
6 Claims. (Cl. 181—.5)

ABSTRACT OF THE DISCLOSURE

To eliminate ghosting reflections from seismograms, the earth is impulsed to transmit seismic energy thereinto having a waveform substantially defined by the formula $$E = f(t) + 2R_{12}R_{23}f\left(t - \frac{2h}{C}\right) + R_{12}{}^2R_{23}{}^2f\left(t - \frac{4h}{C}\right)$$

where $f(t)$ is a desired seismic wave time function,
$R_{12}$ is the seismic wave reflection coefficient at said upper interface,
$R_{23}$ is the seismic wave reflection coefficient at said lower interface,
$h$ is the thickness of said formation, and
$C$ is velocity of seismic waves through said formation.

The resulting earth vibrations are detected to form a seismogram. The seismic signal may comprise the sum of a plurality of elongated vibratory seismic wave trains having the same wave shape and different amplitude and spaced apart in time by a predetermined time interval, each of the wave trains being nonrepetitive for a given time duration.

---

This invention relates generally to the art of seismic exploration, and more particularly to the elimination of multiple reflection events on seismograms.

In the usual type of seismic prospecting, a relatively sharp pulse of elastic wave energy is injected into the earth from a location at or near the earth's surface. The pulse of elastic wave energy may be produced by detonating a charge or dynamite or other explosive material in a shot hole drilled into the earth, or by impulsing the earth by dropping a heavy weight thereon, or by detonating explosive gases to drive a plate against the earth. At marine areas, seismic impulses have been produced by suddenly discharging compressed gases into the water. In any event, the resulting seismic waves are detected by means of geophones located at a plurality of detecting stations or locations spaced apart more or less linearly in a detecting array. Electrical output signals from the geophones are simultaneously recorded to form a multiple trace seismogram. The seismogram is examined and operated on in various ways to pick out reflected, refracted, and diffracted waves therein that are indicative of the nature of the subsurface strata. In order to determine the depth of a given stratum, the two-way travel time of the seismic waves between the earth's surface and the stratum (as well as velocity of the waves in the strata through which the waves travel) must be measured very exactly. In this method of seismic prospecting, all the elastic wave energy is injected into the earth at substantially the same time, and undesired components of the traces of the seismograms may be distinguished or eliminated by frequency discrimination.

In the so-called "continuous wave" seismic prospecting technique, an elongated vibratory seismic signal or wave train is injected into the earth. Preferably, the injected seismic signal is nonrepetitive during a time interval which is substantially longer than the travel time of the signal along the longest travel path of interest. Seismic waves produced by the vibratory seismic signal are detected at one or more detecting locations removed from the injecting or transmitting location. It is the practice to produce a counterpart or replica electrical signal (i.e., an electrical signal substantially the same as the injected seismic signal) by means of the geophone at the injecting location. The replica signal is cross correlated with each signal produced at the detecting station, which cross correlation is carried out at a plurality of time-phase relationships between each signal and the replica signal. The time-phase relationship of the replica signal and each signal cross correlated therewith which yields the greatest value of correlation is used as a parameter of the travel time of the injected signal from the injecting location to the detecting location corresponding to said each signal. Correlation between the replica signal and an electrical signal representative of detected seismic waves typically has been accomplished by initially recording both signals, reproducing the signals as time series, combining the time series while emphasizing amplitude variations in the combined time series, integrating the resulting signal, and shifting the time-phase relationship between the reproduced signals with respect to their time-phase relationship as originally recorded. A particularly satisfactory form of injected signal is a sinusoid which is varied back and forth between two states thereof, such as mutually opposite phase relationships, in accordance with a binary code, preferably a pseudo-random binary code such as a binary code of maximal length.

The detection and identification of reflected seismic waves is complicated by the presence of extraneous signals picked up by the geophones, such as clutter and noise produced by random ground unrest and by other uncontrolled seismic sources. In addition, at some locations, multiply reflected seismic waves are particularly troublesome. Such waves, sometimes referred to as "ghosts," are produced by seismic energy which is trapped in an earth stratum and reflected back and forth between the upper and lower boundaries thereof one or more times before being detected by a particular geophone. The ghosts produce lineups or correlatable events which can be confused with correlatable events which are produced by singly reflected seismic waves. Furthermore, the ghosts can interfere with singly reflected seismic waves of diminished amplitude from deep reflecting horizons so as to substantially mask such singly reflected waves. Therefore, in so-called "trouble" areas, multiple reflections make it quite difficult to obtain geophysical information by the seismic technique.

It has been discovered that up-going seismic waves, when downwardly reflected by a reflecting horizon, undergo a phase reversal. In accordance with the present invention, ghost events on seismograms are eliminated by transmitting into the earth from a given level at a transmitting location seismic energy having a waveform substantially defined by the formula $$E = f(t) + 2R_{12}R_{23}f\left(t - \frac{2h}{C}\right) + R_{12}{}^2R_{23}{}^2f\left(t - \frac{4h}{C}\right)$$

where
$f(t)$ is a desired seismic wave time function,
$R_{12}$ is the seismic wave reflection coefficient at said upper interface,
$R_{23}$ is the seismic wave reflection coefficient at said lower interface,
$h$ is the thickness of said formation, and
$C$ is velocity of seismic waves through said formation.

Objects and features of the invention not apparent from the above discussion will become evident upon consideration of the following detailed description of the invention taken in connection with the accompanying drawings, wherein.

Figure 1:
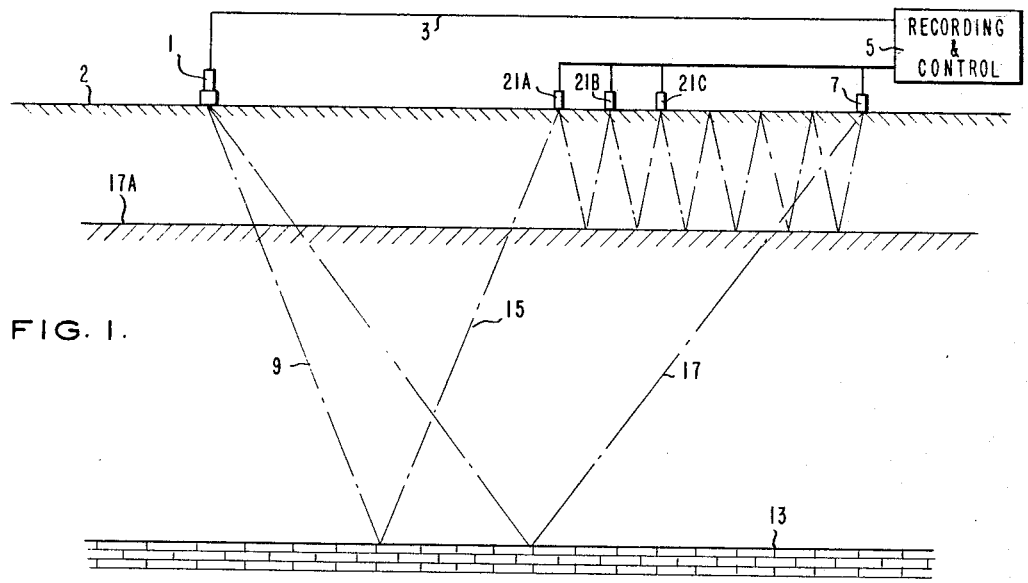
FIG. 1 is a schematic diagram illustrating a cross section of the earth and apparatus for performing a seismic observation.

With reference now to FIG. 1, reference numeral 2 designates the earth's surface, reference numeral 17A designates a near surface reflecting horizon, such as the bottom of the weathered layer, and reference numeral 13 designates a deep reflecting horizon. By the earth's surface is meant not only the surface of the ground, but also the surface of water in marine or water-covered areas of the earth. In marine or submerged areas, the reference numerals 17A would indicate the bottom of the water-submerged area. Positioned at or near the earth's surface there is indicated a seismic wave generating source 1. This source may be any of a number of devices such as a gas gun or a heavy weight to be dropped to the earth's surface, but preferably is a vibrator such as an electrically actuated vibrator for producing controlled continuous-wave seismic waves. The operation of the seismic wave generator 1 is controlled from a recording and control device 5 over an electrical line 3. Recording and control device 5 may be any of a number of commercial devices, and preferably is one of the types whereon seismic waves are recorded on a magnetic tape and electrical signals are produced for the purpose of controlling the operation of the seismic source 1. When the seismic source 1 is an earth vibrator, a geophone usually will be placed on or near the vibrator to produce replica or counterpart seismic signals indicative of the signal as transmitted into the earth, which signals will be transmitted to the control and recording device 5 for recordation on one of the tracks thereof.

FIG. 1 will now be discussed assuming that a single pulse seismic signal is produced by the source 1. When the source 1 is actuated by transmitting a suitable control signal over line 3 from control and recording device 5, the impulse transmitted into the earth will be propagated in all directions. Some of the energy will follow the ray path 9, and after transmission through the earth, will be reflected by a reflecting horizon 13. A portion of the energy will be trapped in the weathered layer and will reverberate back and forth between the upper and lower surfaces thereof, or will be diffracted by the bottom of the weathered layer and transmitted to various detecting locations spaced apart from the transmitting location at which seismic source 1 is positioned. All of this is well known to the art and will not be further discussed herein. The energy reflected by the reflecting horizon 13 will also follow a number of ray paths before being detected by any particular geophone 7. For example, some of the energy may follow the ray path 15 and be reflected back and forth between the top and bottom of the weathered layer before being detected by the geophone. Other energy will be singly reflected and will follow the ray path 17. The signal produced by geophone 7 will be very complex and will therefore comprise not only events produced by singly reflected energy such as that following ray path 17, but also will comprise events produced by multiply reflected energy following ray path 15 and other multiply reflected energy which is initially trapped in the weathered layer, as well as refracted and diffracted energy following various paths to the geophone. In addition, energy may be trapped in near-subsurface earth formations below the weathered layer, and after being re-reflected one or more times, will be detected by the geophone 7. However, it is generally the energy that is re-reflected in the stratum immediately below the earth's surface that causes the most trouble.

Figure 2:
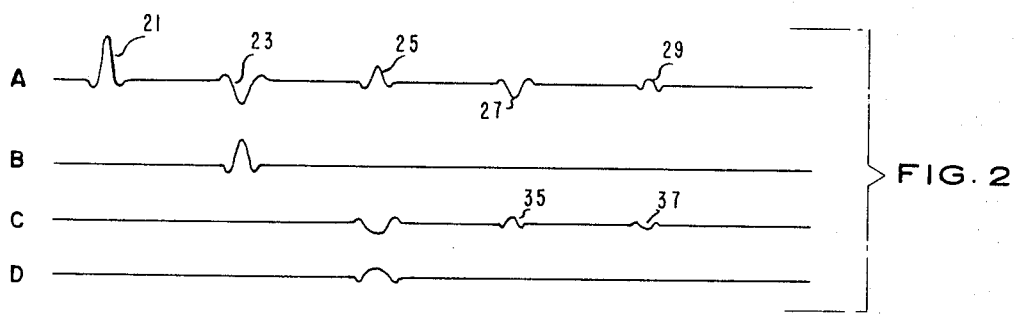
FIG. 2 are waveforms for explaining the invention in connection with FIG. 1.

As indicated above, up-going energy that strikes an interface and is reflected thereby undergoes a phase reversal. Waveform A of FIG. 2 represents on a time scale the wave shape of signals that would be received responsive to re-reflected seismic energy were detectors positioned at each of the locations at which the energy following ray path 15 is reflected and re-reflected. Waveform A is not meant to designate a seismic trace (a signal produced by a single geophone), but indicates only the strength of a "packet" of multiply reflected seismic energy at various times. Viewed in another manner, the pulse 21 indicates the shape of the seismic signal that would be produced by geophone 22A at the point of initial re-reflection at the earth's surface. Pulse 23 indicates the signal that would be produced by a geophone 21B at the second re-reflection at the earth's surface, and pulses 25, 27, and 29 respectively indicate the shape of the pulse produced by geophone 21C at the third, fourth, and fifth re-reflections at the earth's surface. It is to be noted that after each re-reflection, the amplitude of the re-reflected energy is considerably decreased in accordance with the reflection coefficient at the particular interface. It is to be further noted that the wave shape of pulses 23 and 27 is opposite to that of pulses 21, 25, and 29.

In accordance with the present invention, at the transmitting location at which seismic waves are injected into the earth at or near the earth's surface, there is produced seismic energy having a waveform substantially defined by the formula $$E = f(t) + 2R_{12}R_{23}f\left(t - \frac{2h}{C}\right) + R_{12}^2 R_{23}^2 f\left(t - \frac{4h}{C}\right)$$

where the quantities $f(t)$, $R_{12}$, $R_{23}$, $h$, and $C$ are as defined above. In the example shown in FIG. 1, $R_{12}$ would be the reflection coefficient between the top of the weathered layer (or of the water) and the air. $R_{23}$ would be the reflection coefficient at the bottom of the weathered layer (or at the water bottom). Assuming that $f(t)$ represents a pulse having the general wave shape of the pulse 21 of FIG. 2, and further assuming that the multiple reflections which it is desired to eliminate are those following ray paths 9 and 15 of FIG. 1, it is apparent that the injected seismic energy will consist of several pulses respectively spaced apart in time by a time interval determined by the quantity $2h/C$, the second and third pulses having amplitudes given by the quantities $2R_{12}$, $R_{23}$, and $R_{12}^2$, $R_{23}^2$, respectively. The quantities $R_{12}$ and $R_{23}$ are usually known or can be easily determined. It is well known, for example, that the reflection coefficient between two formations X and Y is given by the quantity $$\frac{V_x D_x - V_y D_y}{V_x D_x + V_y D_y}$$

where $V_x$ and $V_y$ are respectively the velocity of seismic waves through the upper and through the lower beds bordering an earth interface, and $D_x$ and $D_y$ are respectively the densities of the upper and lower beds or earth formations. Where the densities of the beds or formations are not known, cores may be taken and physical measurements made thereon for the purpose of obtaining the densities thereof. Where velocities are not known, a seismic velocity logger may be run in a core hole drilled for the purpose of obtaining such information, or other well-known techniques may be followed.

When there is produced at the earth's surface a seismic signal having a waveform determined by the above equation, the portion $f(t)$ of the signal will produce an electrical signal having the shape of pulse 21 at a geophone at the earth's surface. The energy reflected downwardly from the earth's surface 2 will combine with the signal defined by the relationship $$2R_{12}R_{23}f\left(t - \frac{2h}{C}\right)$$

and will be almost entirely canceled out. However, it has been found impossible to completely cancel out such initially reflected energy, and a very small seismic wavelet will remain as indicated by signal C of FIG. 2 which, if allowed to continue, will be re-reflected as indicated by pulses or wavelets 35 and 37. The portion $$R_{12}{}^2 R_{23}{}^2 f\left(t - \frac{4h}{C}\right)$$

of the transmitted seismic signal will be of the correct amplitude and time relationship to cancel out the seismic wavelet remaining so that geophones positioned at the earth's surface will produce output signals responsive only to direct reflections and not to re-reflected seismic waves.

Figure 3:
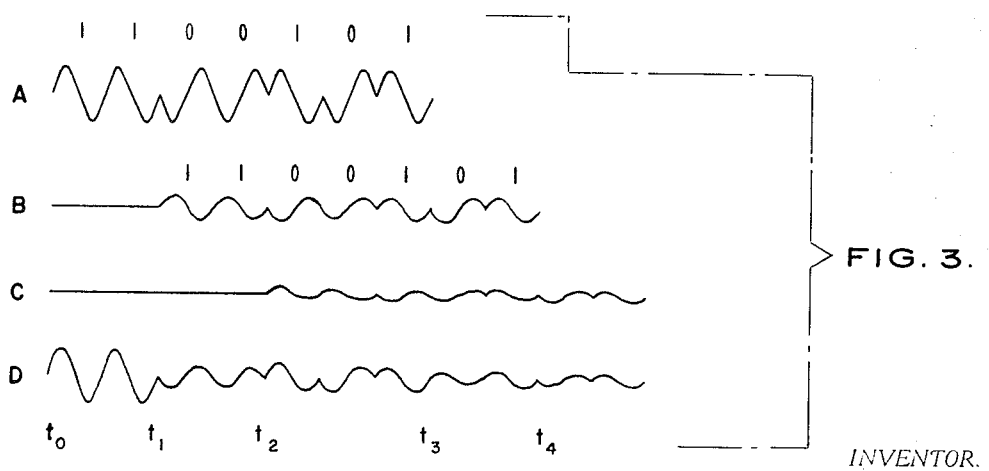
FIG. 3 are waveforms for explaining a preferred embodiment of the invention.

A preferred form of the invention makes use of continuous wave seismic signals wherein a sinusoid is varied back and forth between two states, such as between mutually opposite phase relationships, in accordance with a pseudo-random binary code, such as a binary code of maximal length. The waveforms of FIG. 3 illustrate how this can be done while using only a single vibrator. In waveform A of FIG. 3 there is illustrated a signal formed from a sinusoid varied back and forth between mutually opposite phase relationships, which is indicative of the binary code group 1100101. It is realized that this code group is not truly a pseudo-random code much less a binary code of maximal length, inasmuch as such codes usually have from about 31 up to many thousands or millions of bits. However, the above code group is sufficient for present purposes to illustrate how a seismic signal in accordance with the invention can be constructed.

Assume that a seismic signal $f(t)$ has the wave shape of waveform A of FIG. 3, that a seismic wave $$2R_{12}R_{23}f\left(t - \frac{2h}{C}\right)$$

has the wave shape given by waveform B of FIG. 3, and that a seismic signal $$R_{12}{}^2 R_{23}{}^2 f\left(t - \frac{4h}{C}\right)$$

has the wave shape given by waveform C of FIG. 3. Each of waveforms A, B, and C is indicative of the code group 1100101. The only difference between the waveforms A, B, and C is their amplitude and the relative time dispositions thereof, the quantity $2h/C$ being a time displacement equal to two cycles of the signal of wavefor A. To construct a signal indicative of $f(t)$, etc., it is necessary only to add together waveforms A, B, and C as illustrated in waveform D. Therefore, the seismic signal having the wave shape of waveform D produced by a single vibrator will be the same as the seismic signal produced by several vibrators respectively producing signals indicated by waveforms A, B, and C with the above-indicated time relationship.

A seismic signal having the wave shape of waveform D can be produced in the following manner. An electric signal having the wave shape of waveform A is easily produced in accordance with prior art techniques, as by relay circuits which switch sinusoidal signals of opposite phase relationships to an output circuit responsive to pulses supplied to the relay windings in accordance with a binary code of maximal length. Such an electrical signal can be recorded on a magnetic tape. The recorded signal can then be reproduced by three reproducing heads spaced apart in accordance with the desired time relationship to be effected therebetween. The three signals can then be amplified or attenuated until the desired relationship between the amplitudes thereof is obtained. The signals can then be summed in an adding circuit, and the summed signal can be used to drive an electroacoustic transducer, which may be one of the many types known to the prior art for producing seismic signals in accordance with amplitude variations of an electrical signal.

Where information as to the quantities $R_{12}$ and $R_{23}$ is lacking and is impossible or inconvenient to obtain, the following procedure may be followed to determine the correct time relationship between the components of the transmitted signal and the correct relative amplitudes therebetween when the continuous wave prospecting technique is followed. Based on experience, an initial amplitude relationship and an initial time relationship can be determined and the relative dispositions of the recording heads and the setting of the amplifiers or attenuators described above can be adjusted in accordance therewith to produce a desired output signal. A seismic observation can be performed and, based on amplitudes of multiple reflections on the seismogram and correlogram obtained by this observation, the time relationship and amplitude relationship of the components of the composite signal can be readjusted. This procedure can be repetitively followed until multiple reflections on the resulting seismograms are eliminated or reduced to an acceptable level.

It is manifest that when the continuous wave seismic prospecting technique is used, in addition to forming a seismogram, of necessity there will be formed a correlogram using known methods and apparatus. Inasmuch as the practice of continuous wave prospecting is well known to the art, as exemplified by U.S. Patent 3,185,958, no attempt will be made herein to describe in detail such methods and apparatus. It is to be noted, however, that in the step of forming a correlogram, it is not the signal actually injected into the earth that is cross correlated with the seismic signals produced by the geophones or reproduced from recorded geophone signals, but instead, the original binary coded waveform (such as represented by waveform A of FIG. 3) is cross correlated with the seismic signal.

Having described the principle of the invention and the best mode in which I contemplate applying that principle, I wish it to be understood that the apparatus and method described are illustrative only, and that other means can be employed without departing from the true scope of the invention as defined in the following claims.

What is claimed is:

1. In seismic exploration wherein seismic energy is transmitted into the earth at a transmitting location and is detected at one or more receiving locations to produce a seismogram, the improved method of eliminating from the seismogram those reflection events produced by seismic energy multiply reflected between upper and lower interfaces of an earth formation comprising:

obtaining the seismic wave reflection coefficients at said upper and lower interfaces;

transmitting into the earth from a given level at said transmitting location seismic energy having a waveform substantially defined by the formula $$E = f(t) + 2R_{12}R_{23}f\left(t - \frac{2h}{C}\right) + R_{12}{}^2 R_{23}{}^2 f\left(t - \frac{4h}{C}\right)$$

where $f(t)$ is a desired seismic wave time function,
$R_{12}$ is the seismic wave reflection coefficient at said upper interface,
$R_{23}$ is the seismic wave reflection coefficient at said lower interface,
$h$ is the thickness of said formation, and
$C$ is velocity of seismic waves through said formation.

2. The method of claim 1 wherein said step of transmitting seismic energy into the earth includes the steps of producing an electrical signal having a waveform defined by said formula $$E = f(t) + 2R_{12}R_{23}f\left(t - \frac{2h}{C}\right) + R_{12}{}^2 R_{23}{}^2 f\left(t - \frac{4h}{C}\right)$$

and driving an electroacoustic transducer with said electrical signal.

3. The method of claim 2 wherein the quantity $f(t)$ is a sinusoid varied between opposite phase relationships in accordance with a pseudo-random binary code.

4. A method of seismic prospecting comprising:

(a) at a given seismic wave transmitting location, transmitting into the earth a seismic signal comprising the sum of a plurality of elongated vibratory seismic wave trains having the same wave shape and different amplitude, and spaced apart in time by a predetermined time interval, each of said wave trains being non-repetitive for a given time duration;

(b) at at least one seismic wave receiving location, detecting earth vibrations resulting from seismic waves produced by said seismic signal being transmitted into the earth at said transmitting location, and recording the detected earth vibrations as a function of time;

(c) forming a correlogram by cross correlating an electrical signal which is a replica of one of said wave trains with an electrical signal reproduced from the recording of the earth vibrations formed by step (b); and (d) repetitively repeating steps (a), (b), and (c) with different amplitudes of said seismic wave trains and different time intervals therebetween until correlogram events identifiable as resulting from multiple reflections are minimized.

5. The method of claim 4 wherein each seismic wave train is in the form of a pseudo-random seismic signal.

6. The method of claim 5 wherein each of said seismic wave trains is in the form of a sinusoid varied between mutually opposite phase relationships in accordance with a pseudo-random binary code.

References Cited

UNITED STATES PATENTS

| | | | |
|---|---|---|---|
| 2,745,507 | 5/1956 | Bodine | 181—0.5 |
| 2,989,726 | 6/1961 | Crawford et al. | 340—15.5 |
| 3,066,754 | 12/1962 | Johnson | 181—0.5 |
| 3,185,958 | 5/1965 | Masterson et al. | 340—15.5 |
| 3,221,298 | 11/1965 | Burns | 181—0.5 X |
| 3,278,893 | 10/1966 | Silverman | 181—0.5 X |

BENJAMIN A. BORCHELT, *Primary Examiner.*

M. F. HUBLER, *Assistant Examiner.*